United States Patent
Trencseni et al.

(10) Patent No.: US 11,509,247 B2
(45) Date of Patent: Nov. 22, 2022

(54) DEVICE AND METHOD TO REDUCE CLUTCH ENGAGEMENT SPEED

(71) Applicant: KNORR-BREMSE Systeme fuer Nutzfahrzeuge GmbH, Munich (DE)

(72) Inventors: Balazs Trencseni, Budapest (HU); Tibor Kandar, Sukoro (HU); Jozsef Zsolt Ferencz, Budapest (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 109 days.

(21) Appl. No.: 16/970,868

(22) PCT Filed: Feb. 4, 2019

(86) PCT No.: PCT/EP2019/052654
§ 371 (c)(1),
(2) Date: Aug. 18, 2020

(87) PCT Pub. No.: WO2019/166189
PCT Pub. Date: Sep. 6, 2019

(65) Prior Publication Data
US 2020/0389103 A1  Dec. 10, 2020

(30) Foreign Application Priority Data

Feb. 27, 2018 (EP) .................................. 18159016

(51) Int. Cl.
*H02P 3/22* (2006.01)
*H02P 29/024* (2016.01)
*H02P 6/24* (2006.01)

(52) U.S. Cl.
CPC .................. *H02P 3/22* (2013.01); *H02P 6/24* (2013.01); *H02P 29/025* (2013.01)

(58) Field of Classification Search
CPC ............. H02P 3/22; H02P 6/24; H02P 29/025
USPC ...... 318/299, 380, 400.2, 515, 516, 528, 563
See application file for complete search history.

(56) References Cited

U.S. PATENT DOCUMENTS

| | | | |
|---|---|---|---|
| 5,426,355 A | 6/1995 | Zweighaft | |
| 2013/0320895 A1* | 12/2013 | Shibata | H02P 6/24 318/400.22 |
| 2015/0263650 A1* | 9/2015 | Kuttel | H02P 3/22 254/362 |

(Continued)

FOREIGN PATENT DOCUMENTS

CN  107134952 A  *  9/2017  ............. H02P 27/06
DE  10 2006 037 745 A1   2/2008

(Continued)

OTHER PUBLICATIONS

International Search Report (PCT/ISA/210) issued in PCT Application No. PCT/EP2019/052654 dated Apr. 9, 2019 (two (2) pages).

(Continued)

*Primary Examiner* — Jorge L Carrasquillo
(74) *Attorney, Agent, or Firm* — Crowell & Moring LLP

(57) ABSTRACT

A safety device includes a safety module and a safety control module in order to reduce a speed of an unwanted clutch engagement when a malfunction of a motor for a clutch control actuator occurs, such as by the power supply for the motor being interrupted, so that a driver can have more time to react in such situation.

11 Claims, 2 Drawing Sheets

(56) References Cited

U.S. PATENT DOCUMENTS

2017/0366118 A1* 12/2017 Gyoten ............... H02M 1/08

FOREIGN PATENT DOCUMENTS

| | | | | |
|---|---|---|---|---|
| DE | 10 2010 035 798 A1 | 3/2011 | | |
| DE | 102010035798 A1 * | 3/2011 | ............... | H02P 3/22 |
| FR | 3022887 A1 * | 1/2016 | ........... | B64C 25/405 |
| WO | WO 2008/107035 A1 | 9/2008 | | |
| WO | WO-2008107035 A1 * | 9/2008 | ............... | H02H 3/33 |
| WO | WO 2016/147007 A1 | 9/2016 | | |

OTHER PUBLICATIONS

Written Opinion (PCT/ISA/237) issued in PCT Application No. PCT/EP2019/052654 dated Apr. 9, 2019 (six (6) pages).
Extended European Search Report issued in European Application No. 18159016.7 dated Sep. 11, 2018 (eight (8) pages).
International Preliminary Report on Patentability (PCT/IB/326 & PCT/IB/373) issued in PCT Application No. PCT7EP2019/052654 dated Sep. 3, 2020, including English translation (Written Opinion (PCT/ISA/237) previously filed on Aug. 18, 2020) (eight (8) pages).
European Communication pursuant to Rule 114(2) EPC issued in European Application No. 18159016.7 dated Sep. 3, 2021 (two (2) pages).
Hughes, A., "Electric Motors and Drives Fundamentals, Types and Applications", Third edition, 2006, pp. 1-28 (28 pages).
Demtroeder, W., "Experimentalphysik 3: Atome, Molekuele und Festkoerper", Third edition, 2005, pp. 472-473 (four (4) pages).

* cited by examiner

DEVICE AND METHOD TO REDUCE CLUTCH ENGAGEMENT SPEED

BACKGROUND AND SUMMARY OF THE INVENTION

The present invention relates to a safety device and a method to reduce a speed of an unwanted clutch engagement when a malfunction of a motor for a clutch control actuator occurs (the power supply for the motor is interrupted).

In a case of automated transmissions, usually an automatic driveline clutch control is applied. Driveline clutches commonly use a plurality of springs to clamp a friction disc to an engine flywheel. The springs are disposed within a pressure plate assembly which is bolted to the flywheel. A mechanical linkage that controls the pressure plate spring mechanism is usually actuated with an electronically controlled actuator. A working medium of the actuator is generally fluid that provides enough power for the actuation. In order to eliminate uncertainties and inaccuracy of fluid mass control to the working cylinder of the actuator, the actuator is also controlled by an electric motor. In this case the motor drives a mechanism that is capable to transfer the motor rotating motion to axial movement that is necessary for opening or closing the clutch over a release bearing.

An unintended motion of the actuator for the clutch can lead to an unexpected rapid change of transmitted torque in the vehicle driveline. The rapid torque changes can cause a quick change of vehicle speed and it requires fast reaction from the driver in order to avoid a hazardous situation during driving. Unintended clutch motions can appear in case of a failure of the actuator or the failure of actuator supply lines. Such a typical error is a malfunction of an electronic supply of the actuator.

Automatic clutch operation devices are wide-ranged especially on commercial vehicle markets. A user requires precise and fast control of a transmitted clutch but at the lowest cost possible. Fulfilling the performance requirement of a smooth and fast control and the electrification trend of vehicle powertrains, lead to applying pure electric power to control the clutch of a vehicle transmission. The performance of the automatic clutch operation devices depends basically on built-in power (capacity), on the moving masses, on the efficiency of the mechanism, on the control quality and on the available amount of energy/power.

One of the most dangerous driving situations can occur if an actually disengaged clutch unintendedly engaged rapidly. In this case the vehicle can suddenly jump (accelerate). Fast and accurate driver reaction is required to avoid an accident. If a pure electric actuator is applied, then a break of electric supply can lead to such situation. The electric motor has to be powered and controlled not only during movement of the clutch, but also during keeping it disengaged. In a malfunction where the motor is not powered anymore to hold the force of a clutch spring, the spring force will close the clutch fast. For example, a clutch engagement time can be less than 50 to 100 ms in a HDV (heavy duty vehicle); however, in this case, an acceptable engagement time in which the driver is able to control the vehicle motion is in a range of some seconds (2 to 5 sec).

Mechanically locking the motor in a disengaged position in order to keep the requested position against the clutch spring without using external electric power can be hardly implemented at a low cost, since it requires additional mechanical and control components. In most cases a slow and controlled engagement of the clutch is required, so that the driver can react to unintended torque changes and the vehicle remains at least partly driveable even with active failure to the driveline. So the driver can manage the avoidance of a hazardous situation and drive to the next service station to repair the vehicle.

It is therefore an object of the present invention to provide a method and a safety device, which are capable of slowing down an engaging speed of the clutch without any additional mechanical component, when a malfunction of the electric motor occurs and the motor lacks power supply to hold the clutch in a disengaged position (to actively drag the clutch spring).

The above problem is solved with a safety device and a method according to the independent claims. Other further advantageous developments of the invention are disclosed in the respective dependent claims.

According to the present invention, a permanent magnet synchronous motor (PMSM) is provided to drive a clutch actuator in an automatic driveline. The PMSM has a rotor with permanent magnets and a stator with at least three coils as phases. Optionally, the coils in the motor are each connected with a resistor.

During the regular operation of the clutch actuator, when the clutch is disengaged, the motor is driven by a motor driver to actively hold (drag) a clutch spring so as to keep the clutch in the disengaged status (the rotor of the motor rotates in a given direction). When a malfunction occurs, the motor suddenly loses power supply, and the rotor stops. At the same time, the resilience force from the clutch spring drags the rotor of the motor to rotate in a reverse direction of the above mentioned direction. In this moment, magnetic fields are induced by an induced flux in the coils, resulting in an acceleration of the reverse rotation of the rotor and a quick release of the clutch spring. According to the present invention, a method to make the coils of the motor shorted is provided to release the flux induced in the coils, and thus eliminate the magnetic fields so that the acceleration of the reverse rotation of the rotor is prohibited and the release of the clutch spring is slowed down.

A safety device according to the invention is provided to control the motor and comprises a safety module and a safety control module. The safety module includes switches for each of the coils of the motor, respectively. The safety control module is configured to provide an output signal to the safety module, which actively holds the switches opened during a regular operation of the motor, and to provide an output signal to the safety module, which closes the switches when a malfunction of the motor is detected, so that the coils are shorted and the release of the clutch spring from the motor is slower than in a normal power-off situation. Furthermore, the safety device is provided with an energy storage device (for example, a capacitor) to be charged with a power supply during the regular operation and said energy storage device is configured to power the safety control module, when a malfunction of the motor occurs, to send the output signal to the safety module to close the switches.

For example, the safety device is configured so that when a malfunction of the motor has occurred, the coils are connected with ground to be shorted.

A braking effect of the safety device depends on the resistance of the coils in the motor. In an advantageous embodiment of the invention, the safety device can be configured so that the resistance of the coils in the motor can be adjusted, either by adjusting the windings of the coils or adjusting the resistance of the optionally connected resistors.

Furthermore, the braking effect of the safety device also depends on the resistance of the switches in the safety module. In an advantageous embodiment of the invention, the switches in the safety module can be configured, so that their resistance can be adjusted.

The switches in the safety module can be any type of electronic switch, for example FET (field-effect transistor) or MOSFET (metal-oxide-semiconductor field-effect transistor) switches.

In a preferred embodiment of the present invention, the safety control module is configured to be connected with a failure control device to receive an input signal to detect whether a malfunction has occurred to the motor.

In a further developed embodiment of the present invention, the energy storage device in the safety device is provided with a Zener-diode configured to set a maximal voltage (Ubrake) charged in the energy storage device. The level of Ubrake is a factor to influence a duration of the brake effect of the motor.

In a further developed embodiment of the present invention, the energy storage device in the safety control module is configured so that its energy storage capability (C) is adjustable. The level of the energy storage capability (C) is another factor to influence the duration of the brake effect of the motor.

Furthermore, the safety control module is configured so that a stored energy in the energy storage device is completely used during an active braking operation by said safety device, until the duration of the braking effect ends. Thus, the capacity of the energy storage device has to be dimensioned accordingly so that the required braking capacity is fulfilled.

Furthermore, the safety control module can be configured so that the energy storage capability (C) and/or a voltage level of the energy storage device is dependent on the power supply.

In a further developed embodiment of the present invention the safety control module is configured so that the energy storage device is ensured to operate at a minimum operational power supply level of the vehicle driveline clutch system with a safety margin.

Further objects and advantages of the present invention will become apparent by reference to the following description of a preferred embodiment and drawings.

DETAILED DESCRIPTION OF THE DRAWINGS

Figure 1:
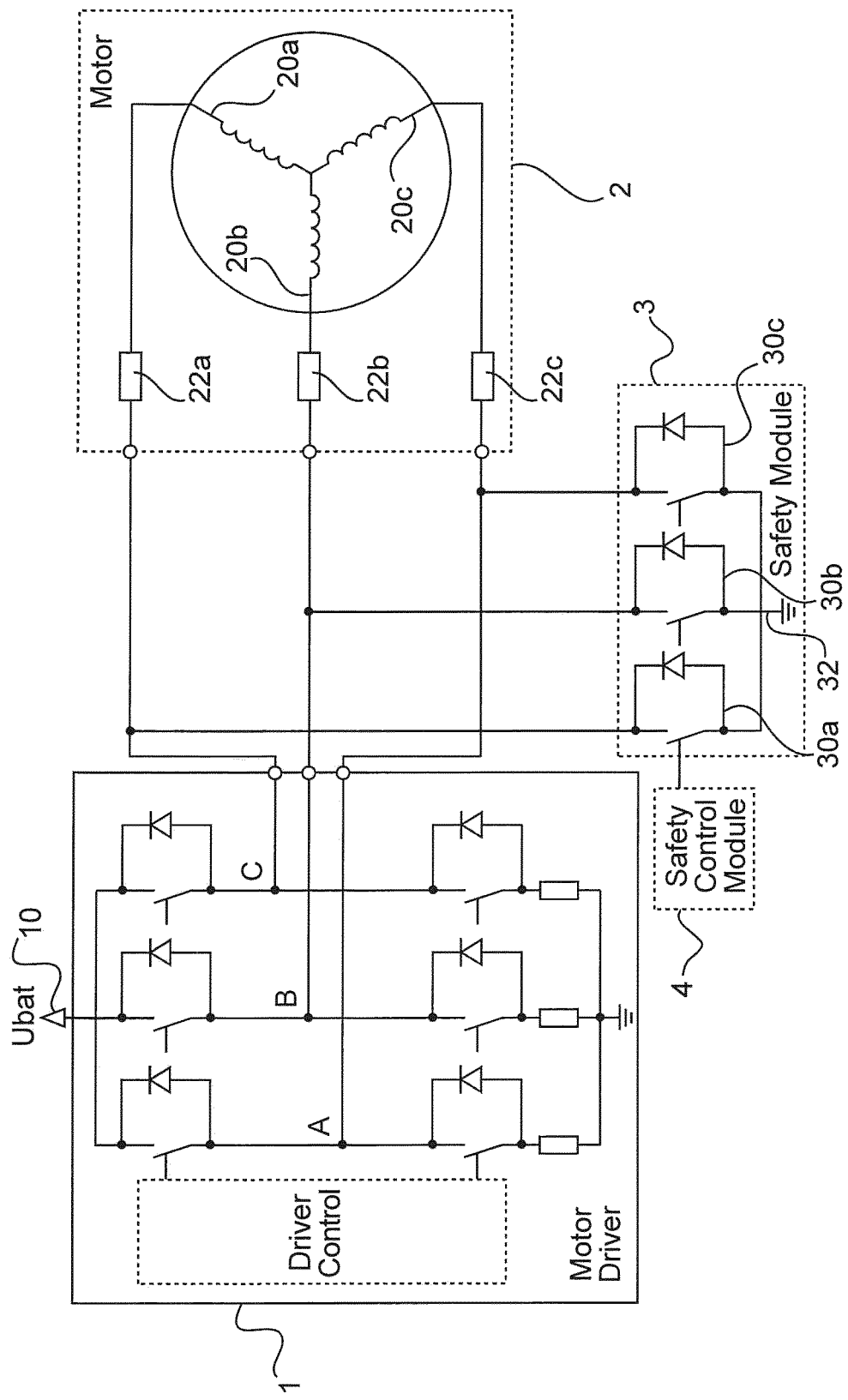
FIG. 1 is a schematic diagram of a motor, a motor driver, a safety module and a safety control module according to one embodiment of the present invention.

FIG. 1 shows an electric motor 2 with three coils 20a, 20b and 20c, each connected with a resistor 22a, 22b and 22c, respectively. The coils 20a, 20b and 20c are mounted on a stator (not shown) of the motor, and a rotor (not shown) of the motor rotates to hold (drag) a clutch spring. A motor driver 1 is provided to control a regular operation of the motor 2, where the motor driver 1 is connected with a power supply 10. A safety module 3 is provided to be connected with the motor 2. The safety module 3 comprises switches 30a, 30b and 30c, which are configured to be connected with each of the coils 20a, 20b and 20c of the motor 2, respectively. A safety control module 4 is provided to be connected with the safety module 3 and controls the switches 30a, 30b and 30c.

Figure 2:
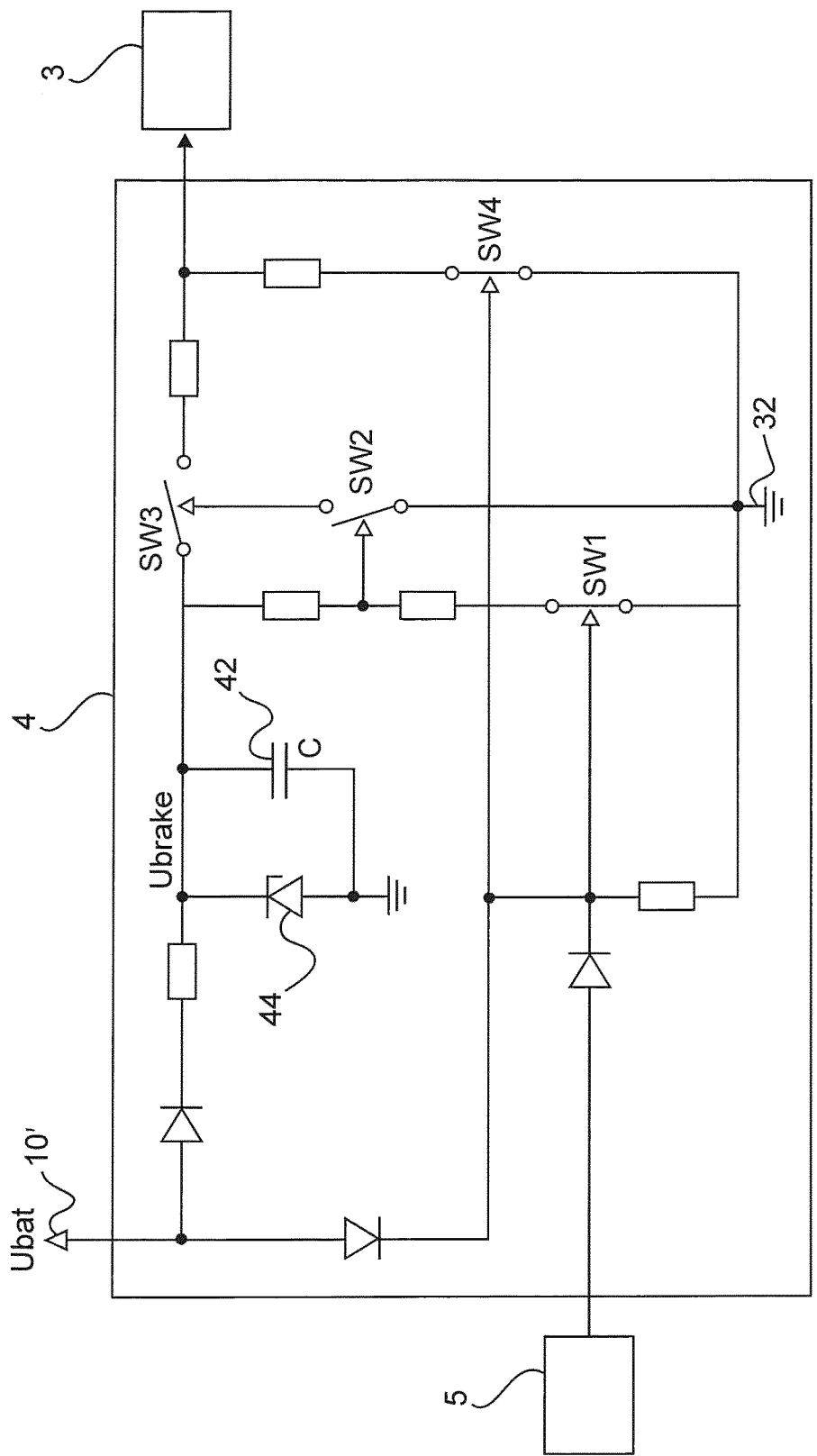
FIG. 2 is a schematic circuit design of the safety control module from FIG. 1.

FIG. 2 shows a detailed circuit design of the safety control module 4 according to a preferred embodiment of the present invention. The safety control module 4 is connected with a failure control device 5 to receive an input signal to decide whether a malfunction of the motor occurs.

During the regular operation, a power supply 10' is active and an energy storage device 42 is charged with the power supply 10'. A Zener-diode 44 is provided to set a maximal voltage level to be charged in the energy storage device 42. Furthermore, the energy storage device 42 is configured to have a predetermined energy storage capacity C.

Four switches SW1, SW2, SW3 and SW4 are built in the safety control module 4. During the regular operation, the power supply 10' is active and controls SW4 so that SW4 is closed and sends a signal to the safety module 3 where the signal is used to keep the switches 30a, 30b and 30c in FIG. 3 open. At the same time, the switch SW1 is held closed, whereas the switches SW2 and SW3 are opened.

When a malfunction occurs, i.e. the power supply 10' is off, SW4 is triggered to be opened, and the failure control device 5 generates a signal to open the switch SW1. Where the trigger can be a predetermined minimal voltage level, for example, when the voltage is lower than the minimal operational power supply level of the vehicle driveline clutch system. Once the SW1 is opened, SW2 is triggered to be closed, followed by SW3 triggered to be closed. At this moment, the energy storage device 42 switches from a power-charging state to a power-supply state, which enables the safety control module 4 to send a signal to the safety module 3 to close the switches 30a, 30b and 30c, so that the coils 20a, 20b and 20c are shorted by being connected to ground 32.

The braking effect of the motor 2 can be adjusted by adjusting the windings of the coils 20a, 20b and 20c, and/or resistance of the resistor 22a, 22b and 22c of the motor 2 and/or resistance of the switches 30a, 30b and 30c of the safety module 3. Furthermore, the duration of the braking effect can be adjusted by the type of the switches 30a, 30b and 30c, a voltage level (Ubrake) and/or the energy storage capability C of the energy storage device 42 of the safety control module 4.

With the above brake device, the coils 20a, 20b and 20c are all shorted by connecting to the ground 32, when a malfunction function occurs and the power supply 10, 10' is off, which eliminates magnet fields generated by a resilience force from a clutch spring to the rotor of the motor 2, so that the release of the clutch spring is slowed down, meaning an unwanted engagement of the clutch is slowed down, providing a driver more time to react.

The invention claimed is:

1. A safety device for an electric motor which controls an actuator for a vehicle driveline clutch system, where the motor includes at least three coils, comprising:
a safety module, including switches for each of the at least three coils of the motor, respectively;
a safety control module configured to provide an output signal to the safety module to actively hold the switches opened during a regular operation of the motor, and to provide an output signal to the safety module to close the switches when a malfunction of the motor is detected, so that the coils are shorted and the motor is stopped slower than in a normal power-off situation;
a failure control device configured to receive an input signal indicative of a motor malfunction; and
an energy storage device to be charged with a power supply during the regular operation,
wherein the energy storage device is configured to power the safety control module, when a malfunction of the motor occurs, to send the output signal to the safety module to close the safety module switches, the safety control module includes switches SW1, SW2, SW3 and SW4, switch SW1 is controllable in response to a signal from the failure control device, switch SW2 is controllable by switch SW1 to close switch SW3, switch SW3 is controllable by switch SW2 to connect the energy storage device to the safety module, switch SW4 is controllable to connect the safety module switches to ground, during regular operation of the motor, switch SW4 is closed such that the safety module switches are maintained open, and switch SW1 is closed such that switches SW2 and SW3 are maintained open, and when a malfunction of the motor is detected, switch SW4 opens to disconnect the safety module switches from ground, the failure control device controls switch SW1 to open, the opening of switch SW1 causes switch SW2 to close, and the closing of switch SW2 causes switch SW3 to close such that energy from the energy storage device is supplied from the safety control module to the safety module switches to cause the safety module switches to close and connect the at least three coils to ground.

2. The safety device according to claim 1, further comprising:
resistors connected with each of the coils,
wherein
the resistors are configured so that their resistance can be adjusted, and/or
the switches are configured so that their resistance can be adjusted.

3. The safety device according to claim 1, wherein the switches are FET or MOSFET switches.

4. The safety device according to claim 1, wherein the energy storage device is at least one of:
(i) a capacitor,
(ii) provided with a Zener-diode configured to set a maximal voltage charged in the energy storage device, and
(iii) configured so that its energy storage capability is adjustable.

5. The safety device according to claim 1, wherein the safety control module is at least one of:
(i) configured so that a stored energy in the energy storage device is configured to be completely used during an active braking operation by said safety device,
(ii) configured so that the capability of the energy storage device is configured dependent on the power supply, and
(iii) configured so that the energy storage device is ensured to operate at a minimum operational power supply level of the vehicle driveline clutch system with a safety margin.

6. The safety device according to claim 1, wherein the switch SW1 is configured to be triggered by a predetermined minimal voltage level.

7. The safety device according to claim 6, wherein the voltage level for triggering the switch SW1 is configured to be lower than a minimal operational power supply level of the vehicle driveline clutch system.

8. A method for a vehicle driveline clutch system to slow down a clutch engagement speed, when a malfunction of a motor for a clutch control actuator occurs, where the motor comprises at least three coils and the motor is driven by a power supply in a regular operation, the method comprising the steps of:

connecting each coil of the motor with a respective switch from a safety device;

keeping the switches opened during a regular operation of the motor;

closing the safety device switches to short the coils when a malfunction of the motor occurs, using an energy from an energy storage device which is charged with a power supply during the regular operation, wherein
the vehicle driveline clutch system includes
a safety control module configured to provide an output signal to the safety device to maintain the safety device switches opened during the regular operation of the motor and to provide an output signal to the safety module to close the safety device switches when a malfunction of the motor is detected so that the coils are shorted and the motor is stopped slower than in a normal power-off situation, and
a failure control device configured to receive an input signal indicative of a motor malfunction, the energy storage device is configured to power the safety control module when a malfunction of the motor occurs to send the output signal to the safety device to close the safety device switches, the safety control module includes switches SW1, SW2, SW3 and SW4, switch SW1 is controllable in response to a signal from the failure control device, switch SW2 is controllable by switch SW1 to close switch SW3, switch SW3 is controllable by switch SW2 to connect the energy storage device to the safety module, switch SW4 is controllable to connect the safety module switches to ground, during the step of keeping the switches open during regular operation of the motor, switch SW4 is closed such that the safety device switches are maintained open, and switch SW1 is closed such that switches SW2 and SW3 are maintained open, and during the step of closing the safety device switches to short the coils when a malfunction of the motor occurs, switch SW4 opens to disconnect the safety device switches from ground, the failure control device controls switch SW1 to open, the opening of switch SW1 causes switch SW2 to close, and the closing of switch SW2 causes switch SW3 to close such that energy from the energy storage device is supplied from the safety control module to the safety device switches to cause the safety device switches to close and connect the at least three coils to ground.

9. The method according to claim 8, wherein at least one of:
(i) resistance of the coils are adjusted by adjusting windings of the coils to adjust braking effect of the motor,
(ii) resistors are provided and connected with the coils and resistance of the resistors is adjusted,
(iii) resistance of the switches are adjusted, and
(iv) an energy storage capability of the energy storage device is adjusted.

10. The method according to claim 8, wherein
a maximal voltage charged in the energy storage device is controlled.

11. The method according to claim 8, wherein the energy storage capability of the energy storage device is adjusted dependent on the power supply.

\* \* \* \* \*